UNITED STATES PATENT OFFICE.

STEPHEN M. ALLEN, OF DUXBURY, MASSACHUSETTS.

MANUFACTURE OF ARTIFICIAL-STONE GRINDERS FOR MAKING WOOD PULP, &c.

SPECIFICATION forming part of Letters Patent No. 235,721, dated December 21, 1880.

Application filed November 26, 1880. (No specimens.)

*To all whom it may concern:*

Be it known that I, STEPHEN M. ALLEN, of Duxbury, State of Massachusetts, have invented a new and useful Improvement in the Manufacture of Artificial-Stone Grinders for Making Wood Pulp and for other Purposes, which improvement is fully set forth in the following specification.

This invention relates more particularly to grinders of emery or artificial stone for reducing wood to pulp in the manufacture of paper, and has for its object to make a hard solid wheel capable of withstanding the action of water and wood-acids, to which it is subjected in operation, and not apt to be injured by frost.

As heretofore manufactured, the grinders have been formed by mixing the abrading material—emery, corundum, quartz, flint, and the like—with a cementing liquid or paste, then tamping and compressing the mass in molds, and, after drying, soaking in a waterproof solution. These stones, however, are not, according to my experience, sufficiently resistant to the action of the elements named, as the waterproofing substance is not properly incorporated in the mass.

In the present invention a waterproofing substance—india-rubber, asphalt, sulphur, resin, pitch, paraffine, oily and gummy matters generally, whether of animal, vegetable, or mineral origin, and the like, or a mixture or composition embracing two or more such substances—is incorporated with the other materials in the grinder in the process of manufacture; and the invention consists, first, in a wood-grinder for making paper-pulp, having thoroughly incorporated in the body of the grinder with the abrading material rubber, asphalt, or other water-proof substance of the character indicated; secondly, in the method of forming a grinder by thoroughly incorporating with abrading material and what is commonly known as "French cement," composed of a metallic oxide (oxide of zinc or magnesium) and a solution of a metallic chloride, (zinc or magnesium chloride,) or other suitable cementing liquid or paste, the waterproofing substance or substances while the mass is plastic, and then compressing or tamping the mass in molds; and, thirdly, in a grinder for reducing wood to pulp or for other purpose, composed of abrading material, waterproofing substance or substances, and the French composition or other suitable cement, thoroughly incorporated and compressed.

The grinders made in accordance with this invention may be formed solid, in the ordinary way, or in sections, in the form of disks, longitudinal lags or staves, and surfacing-plates, as described in Letters Patent granted to me November 25, 1879, and subsequently.

The following description will enable those skilled in the art to which the present invention relates to make and use the same.

Crushed or granulated emery, corundum, flint, quartz, or other abrading material with grains of the proper size is taken in quantity suitable for treatment, and to it is added vegetable, resinous, or gummy substance—usually asphalt pulverized or india-rubber in solution—sufficient to coat over the individual granules, so that they may stick closely together. The whole is formed into a homogeneous mass by agitation, and with pulverized resinous matter heat is applied, so as to cause the same to run freely. Heat is also generally used with a solution for the same purpose. The solvent employed is or may be animal or vegetable oil, coal-oil, naphtha, or the like. The object of this treatment is to give a protective coating to the granules, and such quantities of materials are used as will accomplish the purpose.

The proportions may vary within considerable limits and depend somewhat on the materials themselves. With asphalt, powdered or in solution, three parts to ninety parts of the abrading material will produce good results, and with a solution of rubber five parts.

A suitable metallic oxide (zinc or magnesium oxide, for example) in the form of powder is mixed with the other materials, the mass being stirred or manipulated, either warm or cold, until the granules are well coated, and then with a solution of a suitable metallic chloride, (which may or may not, in certain cases, be of the same metal with the oxide.)

The proportions of the oxide and chloride may be such as heretofore used, and as indicated in the patent to Wood and Elliott, April 23, 1872. The heating of the mass is commonly resorted to, particularly with asphalt and rubber, the better to set the cement with the waterproofing material. The prepared mass is tamped and consolidated in any ordinary or suitable way into rolls, plates, lags, or disks, with or without heating, and is then dried by common or heated air, as well understood.

Sulphur can be introduced in connection with the resinous or oily matter or rubber, so as to partially or wholly vulcanize the same.

The foregoing is an effective method of making grinders in accordance with the invention; but the latter is not limited thereto.

The metallic oxide, either moist or dry, may be first mixed with the abrading material, afterward the waterproofing substance or substances, resinous, gummy, or oily matters, sulphur, and the like, and then the metallic chloride solution.

The order of steps also may be otherwise modified, and the grinder or sections of a grinder can be baked, if desired.

Into the plastic mass aluminous earths or rock cements may be introduced.

Instead of or in addition to the metallic oxide, a sulphide may be used in the so-called "French cement," and a suitable cementing compound liquid or paste other than the French composition may be used.

The second and third parts of this invention are not limited to wood-grinders, although particularly applicable thereto, but include similar articles for grinding or polishing purposes generally, consisting of abrading material, mineral cementing composition, and waterproofing substance or compound thoroughly incorporated with each other and consolidated, and also the process of making said articles.

The granules of the abrading material should be of the size adapted to the particular purpose desired.

Having thus fully explained the said invention and the manner of carrying the same into effect, what I claim is—

1. A wood-grinder of emery or artificial stone for reducing wood to pulp, having thoroughly incorporated in the body of the grinder with the abrading material rubber, asphalt, or similar waterproofing substance or substances, substantially as described.

2. The method of forming grinders of artificial stone or emery by mixing and incorporating with abrading material granulated emery, corundum, flint, or the like, oily, gummy, resinous or similar waterproofing substance, or mixtures of two or more of such substances, and a cement composed of a metallic oxide and a solution of a metallic chloride or other suitable mineral cement, so as to form a plastic mass, and then consolidating said mass, substantially as described.

3. A grinder composed of granulated emery or other abrading material, rubber, asphalt, or other resinous, gummy, or oily water-proof substance or substances, and a mineral cement composed of a metallic oxide combined with a metallic chloride or of other suitable composition, thoroughly incorporated with each other and consolidated, substantially as described.

In testimony whereof I have signed this specification in the presence of two subscribing witnesses.

STEPHEN M. ALLEN.

Witnesses:
 WALTER JONES,
 LUCY C. JONES.